United States Patent [19]
Cinner et al.

[11] 3,841,102
[45] Oct. 15, 1974

[54] METHOD OF IMPROVING THE QUALITY OF LEACHATE FROM SANITARY LANDFILLS

[75] Inventors: Jesse R. Cinner; Ronald J. Polosky, Pittsburgh, Pa.

[73] Assignee: Environmental Sciences, Inc., Pittsburgh, Pa.

[22] Filed: Jan. 2, 1974

[21] Appl. No.: 429,972

[52] U.S. Cl. ................................. 61/35, 210/170
[51] Int. Cl. ......................... C02c 5/02, C02c 5/06
[58] Field of Search ................. 61/35; 210/59, 170

[56] References Cited
UNITED STATES PATENTS

| | | | |
|---|---|---|---|
| 3,586,624 | 6/1971 | Larson | 61/35 |
| 3,718,003 | 2/1973 | Cook et al. | 61/35 |
| 3,720,609 | 3/1973 | Smith et al. | 210/59 |
| 3,732,697 | 5/1973 | Dickson | 61/35 |

*Primary Examiner*—Robert R. Mackey
*Assistant Examiner*—Alex Grosz
*Attorney, Agent, or Firm*—Brown, Murry, Flick & Peckham

[57] ABSTRACT

Waste material is treated by mixing it with an aqueous solution of an alkali metal silicate and a silicate setting agent containing polyvalent metal ions to cause the silicate and setting agent to chemically react with each other and convert the mixture into a consolidated chemically and physically stable earth-like material substantially insoluble in water and with its pollutants entrapped. Landfill material and the treated waste material are disposed in contact with each other on land to be filled and in such relation that the leachate from the landfill material will trickle down through the treated waste material.

10 Claims, No Drawings

METHOD OF IMPROVING THE QUALITY OF LEACHATE FROM SANITARY LANDFILLS

The leachate from sanitary landfills is known to contain such environmental pollutants as acids, metals, large amounts of organic material present as biological oxygen demand material (BOD) and chemical oxygen demand material (COD), toxic organic substances such as phenol and pesticides, and inorganic ions such as cyanide or phosphate or nitrate, among other things. These elements leaching from sanitary landfills eventually reach bodies of water such as ponds, lakes or streams and contaminate them. As a result, sanitary landfills are objectionable from an environmental standpoint.

One attempt to solve this problem is disclosed in U.S. Pat. No. 3,586,624. In that system, before a landfill is started, an impervious membrane is laid on the ground and then the landfill is dumped on it in the usual way. The leachate from the landfill cannot penetrate the membrane and so it is carried away by the membrane to a disposal point where the problem still exists of safely disposing of the leachate. In the patented system, no attempt is made to improve the quality of the leachate so that it will not be harmful. It is simply collected as is.

There also is the separate serious problem of disposing of waste material, particularly industrial wastes, whether solid, liquid, or semi-liquid such as sludge or slurries. The environmental pollutants in such wastes should not be allowed to reach and contaminate bodies of water. To prevent this, it has been common practice to incinerate solid wastes, but this is expensive and it pollutes the atmosphere. It also has been common to convey sludges and liquids to holding ponds, but there are serious objection to that, too. One is that the waste sometimes breaks out of the ponds and may even cause floods, and another objection is that it requires a considerable area of land which then can be used for nothing else.

It is among the objects of this invention to improve the quality of leachate from sanitary landfills so that it will be acceptable to the public, to do this in a simple and inexpensive manner, to simultaneously safely dispose of waste material, and to reduce the cost of sanitary landfills.

In the practice of this invention, land that is to receive a sanitary landfill is selected and then is prepared for the landfill material. This preparation involves spreading over the land a foundation layer of waste material that has been treated in such a way that it has been made non-polluting and fit for ultimate disposal, meaning that it has become acceptable by environmental standards and requires no further treatment. This layer of treated waste material will generally be a foot or more thick. This material is the result of mixing domestic or industrial waste material, either liquid, semiliquid, or subdivided solids, with an aqueous solution of an alkali metal silicate and a silicate setting agent. Although potassium silicate and lithium silicate are suitable, cost and availability must be taken into consideration, and when that is done it is found that sodium silicate is ideal. The silicate setting agent must contain polyvalent metal ions. Suitable setting agents are Portland cement, lime, gypsum and calcium carbonate, since they are the cheapest and most available. Of these, Portland cement is preferred. It is economical to use and readily available in large quantities throughout the United States. Also, its reaction rate with the silicate is easily controlled. The proportions of silicate and setting agent used are such as to cause the resulting chemical reaction to convert the fluid mixture into an earth-like solid material which is consolidated chemically and is physically stable. Generally, the amount of alkali metal silicate setting agent will form less than about 10 percent by volume of the mixture. This earth-like material is substantially insoluble in water, by which is meant that its leaching rate, if any, is so slow as to be of no significance. The pollutants, meaning from an environmental standpoint, in the waste material are entrapped in the solidified silicate which will not dissolve. Waste material treated in this manner is highly suitable for landfill in itself because it is structurally solid and environmentally non-polluting, but in the practice of this invention it is not used for that purpose but for improving the quality of leachate from ordinary sanitary landfill material, so that the leachate itself will not become an environmental problem.

After the treated waste material has been spread over the land to be filled as described above, sanitary landfill material is then brought in and dumped on top of this foundation layer. Usually, 6 to 8 feet of the sanitary landfill material is dumped during the day, forming a layer between about six and eight times as thick as the foundation layer, and then it must be covered. If the complete landfill is to be still deeper, more sanitary landfill can be dumped on top of the covering material the next day. In such a case, the covering material just mentioned is a further layer, at least about 6 inches thick, of waste material treated as described herein. The treated waste material can even be used as the final cover for the landfill when the landfill has been built up to the desired level.

Landfills built up in this manner just described, with alternate layers of treated waste material and landfill material, are the result of my discovery that leachate from sanitary landfill material is greatly improved in quality by trickling or percolating down through the treated waste material. This improvement in quality is brought about by the reaction of the pollutants in the leachate with the treated waste material to the point that, by the time the leachate escapes from the landfill, the leachate is "neutralized" to an extent such that it no longer is an environmental problem. This is a very unexpected result that has extremely great commercial significance. In addition to solving the leachate problem of sanitary landfills, it makes the treated waste material a valuable product in itself that can be used in place of dirt as cover material for sanitary landfills. This is especially important where suitable dirt is not readily available. The treated waste material can be obtained by the landfill operator from the original waste producer without transportation cost to the latter, or the waste producer may even sell the treated material to the landfill operator.

While relatively little data is available on the use of various soils for removing waste constituents in landfill operations, the available data indicate that the results obtained by using treated waste material as disclosed herein are superior to the results obtained with soil. This not only applies in the case of metal ions, but, surprisingly, it has been found that reductions in various forms of nitrogen and in COD are considerably in excess of those reported from similar tests on soil percolation. Also surprising was the fact that whereas extensive treatment with activated carbon has been reported to remove only about 50 to 55 percent of the COD, under the present invention 96 to 97 percent of the COD in the raw leachate is removed. Experience with the use of earth moving equipment on our treated waste material indicates that the physical properties of the material are roughly equivalent to the various soil types normally used in landfills.

As an example of the effect of industrial waste material treated as explained in this specification on landfill leachate, a typical industrial waste was obtained from a steel finishing plant in Illinois. The waste was the sludge from the waste treatment process that neutralizes diluted pickle rinse water and also contained other sludges from the plant's water supply system and from its sanitary sewage system. The constituents of the initial sludge that were analyzed, and their amounts, are shown in the first two columns of the following table I.

TABLE I

| INDUSTRIAL WASTE MATERIAL | | ANALYSIS OF LEACHATE FROM THE TREATED WASTE |
|---|---|---|
| Constituents | Original Sludge | Equivalent Inches of Water—100" |
| Iron | 7,200 ppm | <0.10 ppm |
| Manganese | 34 | <0.10 |
| Nickel | 112 | <0.10 |
| Zinc | 162 | <0.10 |
| Copper | 126 | <0.10 |
| Total Chromium | 51 | <0.10 |

The original sludge was mixed with an aqueous solution of an alkali metal silicate (sodium silicate) and a silicate setting agent containing polyvalent metal ions (Portland cement). The resulting chemical reaction quickly converted the liquid mixture into an earth-like material that was chemically and physically stable and substantially insoluble in water. Some of this earthlike material was subjected to a leaching test to determine the composition of the leachate. In the test, the treated waste material was packed in a tubular column above one inch of inert fibrous material. The space above the treated material in the column was filled with distilled water, which was allowed to seep through the material. This diluent water seeping through the earth-like material was the leachate and was collected. When an amount of the leachate equivalent to 100 inches of ground water percolating through the water was collected, it was analyzed to determine the concentration of any constituents that were leached from it. The results are shown in the right-hand column of the above table in parts per million. It will be seen that in the leachate there was less than one-tenth part per million of each of the enumerated constituents. This means that these constituents in the leachate were negligible and would be harmless. In other words, the pollutants were locked in the treated waste so that it could be disposed of safely.

A quantity of sanitary-landfill leachate obtained from the U.S. Environmental Protection Agency, Cincinati, Ohio, was then analyzed as shown in the Unimproved Leachate column of the following table II.

TABLE II

| E.P.A. LEACHATE | | ANALYSIS AFTER PERCOLATING THROUGH TREATED INDUSTRIAL WASTE | |
|---|---|---|---|
| Constituents | Unimproved Leachate | Equivalent Inches of Leachate—100" | % Reduction of Constituents |
| Iron | 720 ppm | <0.10 | 99.99 |
| Manganese | 3.2 | <0.50 | 84.0 |
| Nickel | 87 | <0.10 | 99.9 |
| Zinc | 42 | <0.10 | 99.8 |
| Copper | 1,200 | <0.10 | 99.99 |
| Total Chromium | 3.8 | <0.25 | 93.0 |
| Cyanide | 2.1 | <0.10 | 99.5 |
| $NH_3 - N$ | 375 | 110 | 71.0 |
| $NO_3 - N$ | 2.4 | <0.25 | 90.0 |
| COD | 38,000 approx. | 1,000 approx. | 97.0 |

Another batch of the same treated waste material referred to in Table I was then subjected to the same leaching test as before, except that the E. P. A. leachate was substituted for distilled water in order to see what effect the waste material would have on that leachate. The results also are shown in the third and fourth columns of Table II and are truly surprising and unexpected, because it will be seen that the E. P. A. leachate leaving the treated waste had a vastly improved quality due to trickling down through the waste material, with most of the constituents having a concentration of only a small fraction of one part per million of leachate. The parts per million of the other constituents likewise were reduced greatly. These reductions are even more apparent when the percentage of reduction is observed in Table II. The data in the two tables show not only that the treated waste material itself is non-polluting and a practically inert landfill material, but also that it renders the leachate from the principal landfill material non-polluting. The treated industrial waste not only is suitable in itself for disposal in sanitary landfills, but also acts very strongly to improve the quality of leachate emanating from the refuse in those landfills. This is an unexpected result which is both useful and novel.

The disclosed improvement in landfill leachate is accomplished by a number of different mechanisms. Those most likely involved are neutralization, ion-exchange, physical filtration and adsorption. Metal ions are removed by neutralization and precipitation, followed by filtration of the suspended solids produced, and by ion-exchange. Cyanide is probably removed by adsorption, as are COD and the various forms of nitrogen.

Another way to practice this invention is to deposit the treated waste in a sanitary landfill as cover material before it has solidified and allow it to sink down into the underlying landfill material where it will solidify in place. This can have advantages on compacted landfill to provide quicker stabilization as far as settling is concerned, since the liquid waste will tend to fill voids in the landfill material to a greater extent than would a solid spread over the surface. To be sure that the voids in the landfill material are filled with the liquid waste, it is advisable to continue pouring the waste until a layer of the mixture on top of the landfill material is several inches thick. Leachate improvement likewise can be better than with a solid, because the treated waste while still liquid will tend to coat the landfill material, thereby limiting exposure of the landfill material to water percolating through it and thus improving the quality of the leachate from the landfill still further.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The method of improving the quality of leachate from sanitary landfill material, comprising treating waste material by mixing with it an aqueous solution of an alkali metal silicate and a silicate setting agent containing polyvalent metal ions to cause said silicate and setting agent to chemically react with each other and convert the mixture into a consolidated chemically and physically stable earth-like material substantially insoluble in water and with its pollutants entrapped in the solidified silicate, and disposing said landfill material and treated waste material in contact with each other on land to be filled and in such relation that said leachate will trickle down through said treated waste material.

2. The method recited in claim 1, in which said treated waste material is spread on the land to be filled to form a foundation layer and is then covered by said sanitary landfill material.

3. The method recited in claim 2, in which said sanitary landfill material forms a layer between about six and eight times as thick as said foundation layer.

4. The method recited in claim 3, in which a second layer of said treated waste material is spread over said landfill material layer, a second layer of landfill material is spread over said second layer of treated waste material, and said second layer of landfill material is covered with earth or earth-like material.

5. The method recited in claim 4, in which said second layer of treated waste material is at least about 6 inches thick.

6. The method recited in claim 1, in which said sanitary landfill material is dumped on the land to be filled, and said aqueous mixture of alkali metal silicate solution and waste material and setting agent is poured over the landfill material nd sinks down into it before said mixture solidifies.

7. The method recited in claim 6, in which the pouring of said mixture over the landfill material is continued until a layer of said mixture several inches thick forms on top of the landfill material.

8. The method recited in claim 1, in which said waste material is a liquid or semi-liquid industrial waste before being treated.

9. The method of improving the quality of leachate from sanitary landfill material, comprising disposing said material and a treated waste material in engagement with each other in such relation that said leachate will trickle down through said treated waste material, the treated waste material being a consolidated chemically and physically stable earth-like material obtained by mixing with waste material an aqueous solution of an alkali metal silicate and a setting agent containing polyvalent metal ions to cause said silicate and setting agent to chemically react with each other and convert the mixture into said earth-like material which is substantially insoluble in water.

10. The method recited in claim 9, in which said landfill material is placed on top of a foundation layer of said treated waste material.

* * * * *

UNITED STATES PATENT OFFICE
CERTIFICATE OF CORRECTION

Patent No. 3,841,102     Dated October 15, 1974

Inventor(s) Jesse R. Conner; Ronald J. Polosky

It is certified that error appears in the above-identified patent and that said Letters Patent are hereby corrected as shown below:

Inventors:    Jesse R. Conner; Ronald J. Polosky,
              Pittsburgh, Pa.

Assignee:    Chemfix Inc.
             Pittsburgh, Pa.

Signed and sealed this 14th day of January 1975.

(SEAL)
Attest:

McCOY M. GIBSON JR.          C. MARSHALL DANN
Attesting Officer             Commissioner of Patents